United States Patent
Zhang et al.

(10) Patent No.: US 9,784,921 B1
(45) Date of Patent: Oct. 10, 2017

(54) SWITCH MATRIX INCORPORATING POLARIZATION CONTROLLER

(71) Applicants: Chunshu Zhang, Kanata (CA); Dominic John Goodwill, Ottawa (CA)

(72) Inventors: Chunshu Zhang, Kanata (CA); Dominic John Goodwill, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/095,746

(22) Filed: Apr. 11, 2016

(51) Int. Cl.
   *G02F 1/01* (2006.01)
   *G02B 6/35* (2006.01)
   *G02B 6/293* (2006.01)

(52) U.S. Cl.
   CPC ......... *G02B 6/3594* (2013.01); *G02B 6/2935* (2013.01); *G02B 6/355* (2013.01); *G02B 6/3546* (2013.01); *G02F 1/011* (2013.01)

(58) Field of Classification Search
   CPC .. G02B 6/3594; G02B 6/2935; G02B 6/3546; G02B 6/355; G02F 1/011
   USPC .................................. 385/1–3, 8, 10, 14–17
   See application file for complete search history.

(56) References Cited

U.S. PATENT DOCUMENTS

| | | | | |
|---|---|---|---|---|
| 5,751,868 A * | 5/1998 | Bala | .................. | G02F 1/313 385/16 |
| 7,006,732 B2 * | 2/2006 | Gunn, III | ............. | G02B 6/1228 359/629 |
| 7,706,649 B2 * | 4/2010 | Futami | ................. | H04B 10/299 385/11 |
| 9,432,750 B1 * | 8/2016 | Li | ...................... | H04Q 11/0005 |
| 2005/0169566 A1 * | 8/2005 | Takahashi | ............... | G02F 1/011 385/1 |
| 2015/0131942 A1 * | 5/2015 | Xu | .......................... | G02B 6/34 385/37 |
| 2016/0013868 A1 * | 1/2016 | Anderson | ............. | H04B 10/60 359/246 |
| 2016/0373843 A1 * | 12/2016 | Jones | ................. | H04Q 11/0071 |

FOREIGN PATENT DOCUMENTS

| WO | 2015018295 A1 | 2/2015 |
|---|---|---|
| WO | 2016029070 A1 | 2/2016 |

OTHER PUBLICATIONS

Sacher, Wesley D., et al., "Polarization rotator-splitters and controllers in a Si3N4-on-SOI integrated photonics platform", Optics Express, vol. 22, No. 9, pp. 11167-11174, 2014.

Doerr, Christopher R., et al., "Monolithic PDM-DQPSK receiver in silicon", 36th European Conference and Exhibition on Optical Communication, pp. 1-3, 2010.

(Continued)

*Primary Examiner* — Ellen Kim
(74) *Attorney, Agent, or Firm* — Gowling WLG (Canada) LLP (57) ABSTRACT

Optical inputs to photonic switches may incorporate a polarization controller in order to change the polarization of the input signal to a pre-determined polarization for operation with the silicon photonics. A last stage of components of the polarization controller may overlap with a first input switching stage. A polarization controller that overlaps with the first stage of the switch input may provide lower insertion loss and power consumption for the photonic switch.

20 Claims, 6 Drawing Sheets

(56) References Cited

OTHER PUBLICATIONS

Chen, Long, et al., "Compact, low-loss and low-power 8×8 broadband silicon optical switch", Optics Express, vol. 20, No. 17, pp. 18977-18985, 2012.
Qian, Yi, et al., "Scalable Photonic Switch with Crosstalk Suppression for Datacenters and Optical Networks", in OECC 2015.
Nakamura, Shigeru, et al., "High extinction ratio optical switching independently of temperature with silicon photonic 1×8 switch", OFC/NFOEC Technical Digest, pp. 1-3, 2012.
Heismann, F., et al., "Polarization-Independent Photonic Switching System Using Fast Automatic Polarization Controllers", IEEE Photonics Technology Letters, vol. 5, No. 11, 1993.
U.S. Appl. No. 15/087,449, entitled "Automatic Endless Polarization Controller for a Silicon-On-Insulator Platform," filed Mar. 31, 2016.
International Search Report of PCT/CN2016/079578 dated Jan. 3, 2017.

\* cited by examiner

SWITCH MATRIX INCORPORATING POLARIZATION CONTROLLER

TECHNICAL FIELD

The current application relates to photonic integrated circuits, and in particular to photonic switches.

BACKGROUND

Silicon on insulator (SOI) circuits may be used to implement photonic switches capable of establishing light paths between a plurality of inputs and outputs. SOI circuits can provide compact photonic circuits. However, the circuits may require an optical signal to have a pre-defined state of polarization, e.g. transverse electric (TE) polarization. As such, photonic integrated circuits may require polarization controllers for adjusting the optical polarization of incoming signals to be TE polarized. Such polarization controllers may be provided as separate components, implemented either on the same photonic chip or off-chip. The additional components of the polarization controller increase the insertion loss and power consumption.

It would be desirable to have an improved switch capable of controlling a state of polarization.

SUMMARY

In accordance with the present disclosure there is provided a photonic switch matrix comprising: a plurality of 1×2 input switches, each 1×2 input switch comprising: an input port for receiving an optical beam; first and second output ports for outputting the optical beam in a pre-defined state of polarization; a polarization controller coupled to the input port for providing the pre-defined state of polarization of the optical beam, the polarization controller including at least one polarization controller stage comprising two optical paths associated with two polarization components of the optical beam; and an optical mixer stage coupled to the two optical paths of the at least one polarization controller stage for mixing light in the two optical paths so as to direct the optical beam in the pre-defined state of polarization to the first or second output port; a plurality of output switches; and a plurality of intermediary switches coupled to the plurality of 1×2 input switches and the plurality of output switches, for selectively establishing optical paths between the plurality of 1×2 input switches and the plurality of output switches.

In a further embodiment of the photonic switch matrix, each one of the plurality of 1×2 input switches further comprises: an input element for splitting the input beam into the orthogonal polarization components.

In a further embodiment of the photonic switch matrix, the input element comprises one of: a polarization rotator splitter; and a polarization splitting surface grating coupler.

In a further embodiment of the photonic switch matrix, each of the at least one polarization controller stages and the optical mixer stage comprise a Mach-Zehnder Interferometer (MZI) structure with at least one phase shifter located in arms of the MZI structure connected at a coupler.

In a further embodiment of the photonic switch matrix, one or more of the couplers of the at least one polarization controller stages and the optical mixer stage comprises one of: a symmetric directional coupler; an adiabatic coupler; and a multimode interference (MMI) coupler.

In a further embodiment of the photonic switch matrix, one or more of the phase shifters of the at least one polarization controller stages and the optical mixer stage comprises one of: a thermo-optic phase shifter; and a carrier injection phase shifter.

In a further embodiment of the photonic switch matrix, wherein a combination of the polarization controller and the optical mixer stage provide a 2-stage polarization controller, and the polarization controller and the optical mixer stage of each one of the plurality of 1×2 input switches comprise: a phase shifter located in one of two arms of a first Mach-Zehnder Interferometer (MZI) structure, the two arms of the first MZI structure coupled to the optical paths associated with the orthogonal polarization components; a first optical coupler connected to the two arms of the first MZI structure providing two output optical paths; at least one phase shifter located in one of two arms of a second MZI structure, the two arms of the second MZI structure coupled to the two output optical paths of the first optical coupler; and a second optical coupler connected to the two arms of the second MZI structure providing two output optical paths.

In a further embodiment of the photonic switch matrix, a combination of the polarization controller and the optical mixer stage provide a 3-stage polarization controller and the polarization controller and the optical mixer stage of each one of the plurality of 1×2 input switches comprise: at least one phase shifter located in one of two arms of a first Mach-Zender Interferometer (MZI) structure, the two arms of the first MZI structure coupled to the optical paths associated with the orthogonal polarization components; a first optical coupler connected to the two arms of the first MZI structure providing two output optical paths; at least one phase shifter located in one of two arms of a second MZI structure, the two arms of the second MZI structure coupled to the two output optical paths of the first optical coupler; a second optical coupler connected to the two arms of the second MZI structure providing two output optical paths; at least one phase shifter located in one of two arms of a third MZI structure, the two arms of the third MZI structure coupled to the two output optical paths of the second optical coupler; and a third optical coupler connected to the two arms of the third MZI structure providing two output optical paths.

In a further embodiment of the photonic switch matrix, a combination of the polarization controller and the optical mixer stage provide a 4-stage polarization controller, and the polarization controller and the optical mixer stage of each one of the plurality of 1×2 input switches comprise: at least one phase shifter located in one of two arms of a first Mach-Zender Interferometer (MZI) structure, the two arms of the first MZI structure coupled to the optical paths associated with the orthogonal polarization components; a first optical coupler connected to the two arms of the first MZI structure providing two output optical paths; at least one phase shifter located in one of two arms of a second MZI structure, the two arms of the second MZI structure coupled to the two output optical paths of the first optical coupler; a second optical coupler connected to the two arms of the second MZI structure providing two output optical paths; at least one phase shifter located in one of two arms of a third MZI structure, the two arms of the third MZI structure coupled to the two output optical paths of the second optical coupler; a third optical coupler connected to the two arms of the third MZI structure providing two output optical paths; at least one phase shifter located in one of two arms of a fourth MZI structure, the two arms of the fourth MZI structure coupled to the two output optical paths of the third optical coupler; and a fourth optical coupler connected to the two arms of the fourth MZI structure providing two output optical paths.

In accordance with the present disclosure there is further provided a photonic switch comprising: a photonic switch matrix comprising: a plurality of 1×2 input switches, each 1×2 input switch comprising: an input port for receiving an optical beam; first and second output ports for outputting the optical beam in a pre-defined state of polarization; a polarization controller coupled to the input port for providing the pre-defined state of polarization of the optical beam, the polarization controller including at least one polarization controller stage comprising two optical paths associated with two polarization components of the optical beam; and an optical mixer stage coupled to the two optical paths of the at least one polarization controller stage for mixing light in the two optical paths so as to direct the optical beam in the pre-defined state of polarization to the first or second output port; a plurality of output switches; and a plurality of intermediary switches coupled to the plurality of 1×2 input switches and the plurality of output switches, for selectively establishing optical paths between the plurality of 1×2 input switches and the plurality of output switches; and a controller for controlling a polarization of the input beams associated with each of the 1×2 switches and for routing optical paths through the switch matrix.

In a further embodiment of the photonic switch, the controller and the photonic switch matrix are implemented on a single silicon on insulator (SOI) chip.

In a further embodiment of the photonic switch, each one of the plurality of 1×2 input switches further comprises: an input element for splitting the input beam into the orthogonal polarization components.

In a further embodiment of the photonic switch, the input element comprises one of: a polarization rotator splitter; and a polarization splitting surface grating coupler.

In a further embodiment, the photonic switch further comprises a plurality of polarization rotator and splitter (PRS) elements located off-chip from the switch matrix, each one of the plurality of PRS elements associated with a respective one of the 1×2 input switches.

In a further embodiment of the photonic switch, each polarization controller stage and the optical mixer stage comprise a Mach-Zehnder Interferometer (MZI) structure with at least one phase shifter located in arms of the MZI structure connected at a coupler.

In a further embodiment of the photonic switch, one or more of the couplers of the at least one polarization controller stage and the optical mixer stage comprises one of: a symmetric directional coupler; an adiabatic coupler; and a multimode interference (MMI) coupler.

In a further embodiment of the photonic switch, one or more of the phase shifters of the at least one polarization controller stages and the optical mixer stage comprises one of: a thermo-optic phase shifter; and a carrier injection phase shifter.

In a further embodiment of the photonic switch, a combination of the polarization controller and the optical mixer stage provide a 2-stage polarization controller and the polarization controller and the optical mixer stage of each one of the plurality of 1×2 input switches comprise: at least one phase shifter located in one of two arms of a first Mach-Zehnder Interferometer (MZI) structure, the two arms of the first MZI structure coupled to the optical paths associated with the orthogonal polarization components; a first optical coupler connected to the two arms of the first MZI structure providing two output optical paths; at least one phase shifter located in one of two arms of a second MZI structure, the two arms of the second MZI structure coupled to the two output optical paths of the first optical coupler; and a second optical coupler connected to the two arms of the second MZI structure providing two output optical paths.

In a further embodiment of the photonic switch, a combination of the polarization controller and the optical mixer stage provide a 3-stage polarization controller and the polarization controller and the optical mixer stage of each one of the plurality of 1×2 input switches comprise: at least one phase shifter located in one of two arms of a first Mach-Zender Interferometer (MZI) structure, the two arms of the first MZI structure coupled to the optical paths associated with the orthogonal polarization components; a first optical coupler connected to the two arms of the first MZI structure providing two output optical paths; at least one phase shifter located in one of two arms of a second MZI structure, the two arms of the second MZI structure coupled to the two output optical paths of the first optical coupler; a second optical coupler connected to the two arms of the second MZI structure providing two output optical paths; at least one phase shifter located in one of two arms of a third MZI structure, the two arms of the third MZI structure coupled to the two output optical paths of the second optical coupler; and a third optical coupler connected to the two arms of the third MZI structure providing two output optical paths.

In a further embodiment of the photonic switch, a combination of the polarization controller and the optical mixer stage provide a 4-stage polarization controller and the polarization controller and the optical mixer stage of each one of the plurality of 1×2 input switches comprise: at least one phase shifter located in one of two arms of a first Mach-Zender Interferometer (MZI) structure, the two arms of the first MZI structure coupled to the optical paths associated with the orthogonal polarization components; a first optical coupler connected to the two arms of the first MZI structure providing two output optical paths; at least one phase shifter located in one of two arms of a second MZI structure, the two arms of the second MZI structure coupled to the two output optical paths of the first optical coupler; a second optical coupler connected to the two arms of the second MZI structure providing two output optical paths; at least one phase shifter located in one of two arms of a third MZI structure, the two arms of the third MZI structure coupled to the two output optical paths of the second optical coupler; a third optical coupler connected to the two arms of the third MZI structure providing two output optical paths; at least one phase shifter located in one of two arms of a fourth MZI structure, the two arms of the fourth MZI structure coupled to the two output optical paths of the third optical coupler; and a fourth optical coupler connected to the two arms of the fourth MZI structure providing two output optical paths.

BRIEF DESCRIPTION OF THE DRAWINGS

Embodiments are described herein with reference to the appended drawings, in which.

DETAILED DESCRIPTION

Photonic switches based on photonic integrated circuits may offer desirable characteristics such as speed, compactness and low power consumption. As described further below, optical inputs to photonic switches may incorporate polarization controllers in order to change the polarization of the input signal to a pre-determined polarization for operation with the silicon photonics. The polarization controllers may be provided by a plurality of cascaded stages with a last stage of controller overlapping with a first input switching stage. That is, the last stage of polarization controller and the first input switching stage are provided by the same component. A polarization controller that overlaps with the first stage of the switch input may provide lower insertion loss and power consumption for the photonic switch due to fewer optical components in the optical path.

Figure 1:
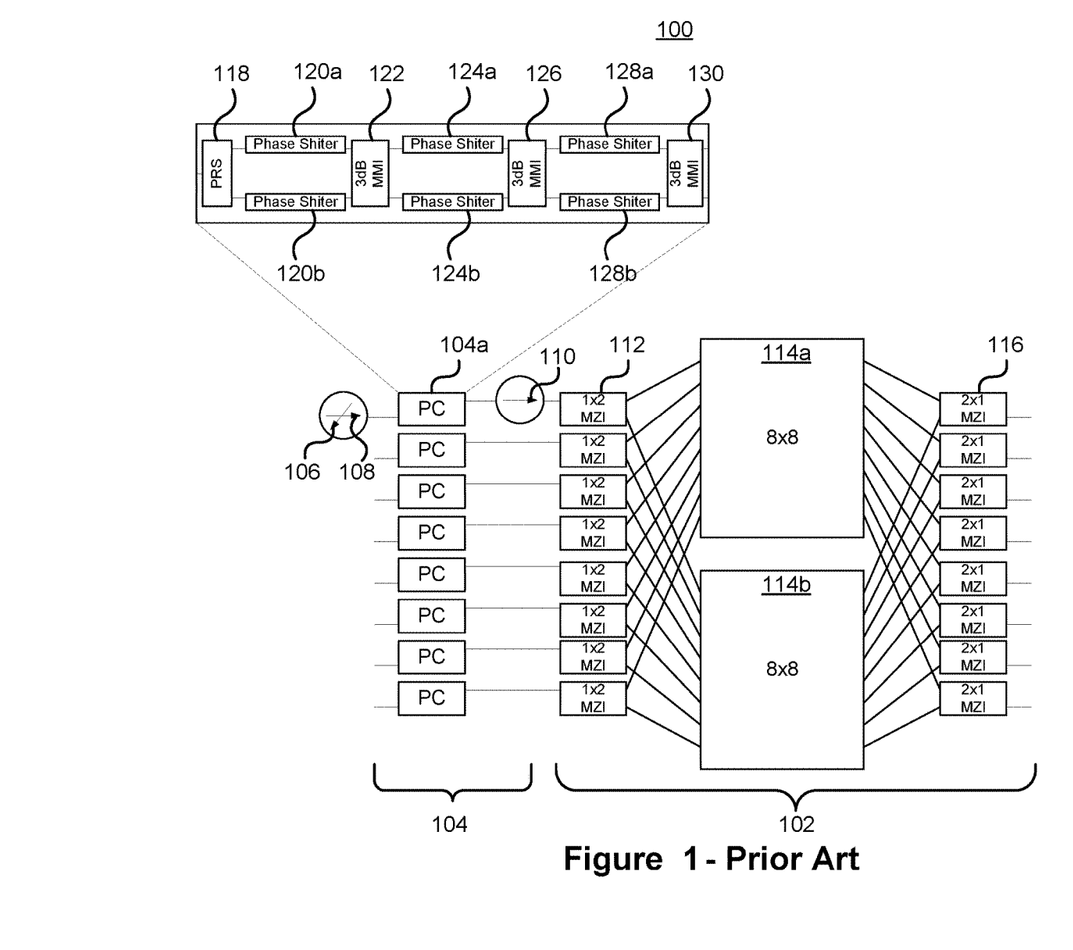
FIG. 1 depicts a prior art photonic switch and polarization controllers.

FIG. 1 depicts a photonic switch structure 100 including a photonic switch 102 and a plurality of polarization controllers 104. The photonic switch 102 comprises a plurality of inputs that can be switched to a plurality of outputs. The photonic switch 102 comprises a number of input switching cells 112 that can switch an incoming signal to an appropriate switching plane 114a, 114b, or section of a single switching plane, that in turn establishes a connection to an appropriate output switching cell 116 in order to establish the desired connection. Although a particular 8×8 switch architecture for establishing connections between 8 inputs and 8 outputs is shown in FIG. 1, different switch architectures are possible. Regardless of the specific switch architecture used, the switches are generally formed from a plurality of individual switching cells. The individual switching cells may be provided by a Mach-Zender Interferometer (MZI) structure comprising a pair of multimode interference (MMI) couplers connected by two phase shifter arms.

The MZI structure may function best with a specific polarization of light. In particular, the individual switching cells may function primarily with transverse electric (TE) polarization. As such, optical power present in a transverse magnetic (TM) polarization is effectively wasted. Accordingly, inputs to the switch 102 may be associated with polarization controllers 104 that convert an optical signal having both a TM polarization component (106) and a TE polarization component (108) to a signal having a single polarization component, such as a TE polarization component (110). The polarization controllers 104 are separate components that add to the insertion loss, increase the component count and increase the complexity of the photonic switch structure 100. Numerous polarization controller architectures are possible depending on the requirements, such as endless, or reset-free, control as well as the ability to adjust any incoming polarization to any output polarization. Generally, the polarization controllers may be provided as a number of cascaded stages. Depending upon the number of stages cascaded together, a different degree of flexibility of the polarization controller may be provided. FIG. 1 depicts a 3-stage polarization controller 104a that is capable of producing a specific polarization from any input polarization without requiring resets—a capability referred to herein as "endless polarization control". As depicted, the polarization controller 104a comprises a polarization beam splitter and rotator 118 that splits an incoming beam into orthogonally polarized components and rotates one of the polarized components. A series of cascaded phase shifter arms 120a, 120b, 124a, 124b, 128a, 128b and 3 dB MMI couplers/splitters 122, 126, 130 allow the unknown polarization to be changed to a particular polarization, such as the TE polarization.

Figure 2:
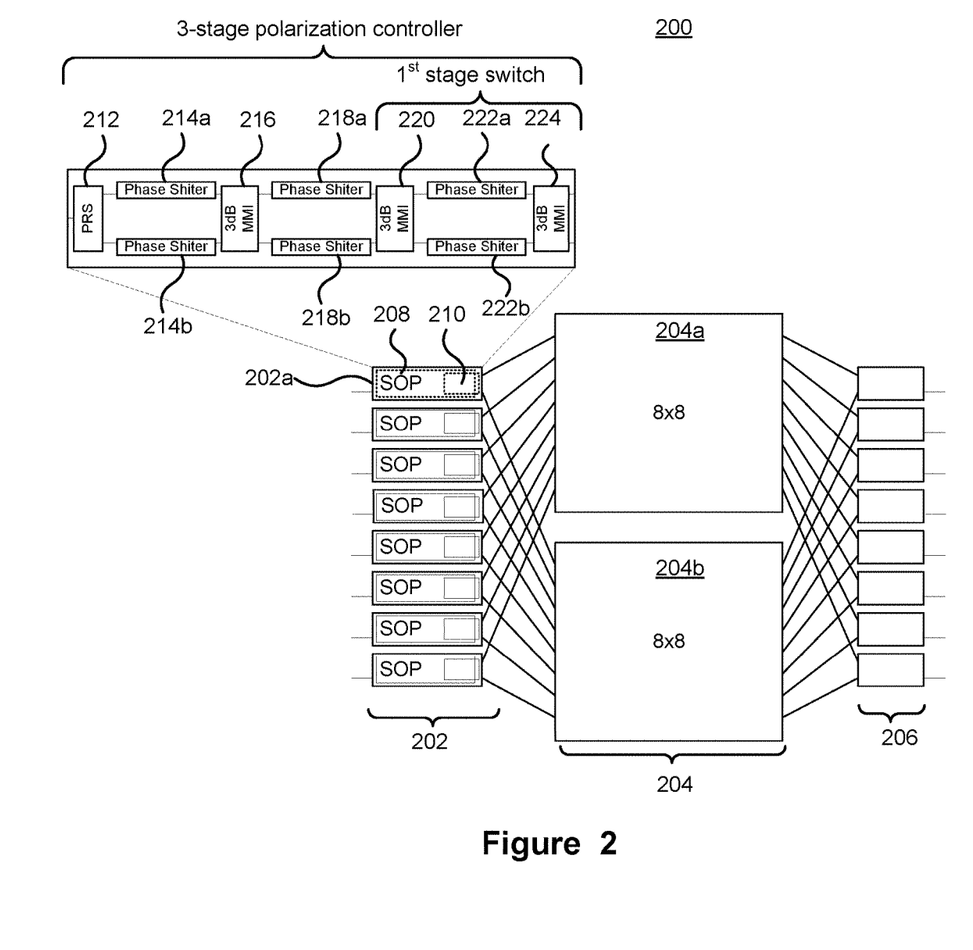
FIG. 2 depicts a photonic switch incorporating polarization controllers.

FIG. 2 depicts a photonic switch incorporating polarization controllers. The photonic switch 200 comprises a number of input stages 202 that each have an optical input for receiving an optical signal to be coupled to one of a plurality of output stages 206. Optical paths are established between the input stages 202 and output stages 206 through a plurality of intermediary switching stages 204. The particular arrangement of the input stages 202, intermediary switching stages 204 and the output stages 206 will depend upon the switch architecture; however, the input stages 202 will typically include one or more optical switches provided by a Mach-Zender Interferometer (MZI) structure for selectively coupling the input optical signal to a particular one of the intermediary switching cells. The intermediary switching cells may be arranged into one or more similar switching planes 204a, 204b. The switch 200 is depicted as being an 8×8, non-blocking switch comprising 2 switching planes each provided by a blocking 8×8 switching plane. Regardless of the particular architecture of the switch 200, it is provided by a number of inter-connected silicon photonic components, which operate with a particular polarization. Accordingly, in order to provide efficient switching of the optical signals, the input optical signal should be of the particular optical polarization, such as TE polarization. The switch 200 incorporates polarization controllers into the input stages 202 of the switch, providing a compact and efficient switch capable of receiving randomly polarized optical signals and converting the incoming signals to the appropriate polarization for the silicon photonic components. As depicted, each of the input stages 202 comprises a state of polarization (SOP) controller 208 that overlaps with the first input stage 210 of the switching cell. That is, the first input switching stages 202 also provide a last stage of the polarization controller 208. By overlapping the polarization controller 208 with the first stage of the switch input 210, lower insertion loss and power consumption are possible.

FIG. 2 depicts details of a polarization controller 208 incorporated into the input stage 202a of the switch. The polarization controller 208 comprise a 3 stage polarization controller that can convert an unknown polarization of incoming light to a particular polarization, without requiring the polarization controller to be reset. The polarization controller 208 comprises a polarization rotator splitter (PRS) 212 that splits the incoming polarized light into orthogonal polarization components. In addition to spitting the beam into orthogonal polarization components, the PRS 212 may also rotate the polarization of one of the components by 90° so that it is parallel to polarization of the other polarization component. The polarization controller 208 comprise comprises 3 phase shifter stages 214a,214b, 218a, 218b, 222a, 222b that are coupled to 3 dB multimode interferometer (MMI) couplers 216, 220, 224. The phase shifter stages 214a,214b, 218a, 218b, 222a, 222b are depicted as being cascaded together to the PRS 212 components located in each of two different arms connected to the MMI couplers 216, 220, 224. The final stage of the polarization controller also acts as the first stage of the switch matrix. That is, the final stage of the polarization controller may be provided by an optical mixer stage that also provides the first switching stage. The output of the final 3 dB MMI coupler 224 may be controlled so that all of the optical power of the input signal is transferred to only one of the two outputs of the coupler depending upon the particular routing required by the switch. As depicted in FIG. 2, the last stage of the polarization controller incorporates the first stage of the switch matrix. The combined last stage of the switch is provided by an MZI structure composed of a pair of phase shifters 222a, 22b located in different arms of the MZI structure and connected to an MMI coupler 224 for combining the phase shifted signals in the two arms.

The photonic switch 200 depicted in FIG. 2 has a multiplane architecture; however, polarization controllers incorporated into input stages may be used with different switch architectures. The different switch architectures may be based on, for example, crossbar architectures, Benes architectures, dilated Banyan architectures, etc. Further, the photonic switch 200 is depicted as a space switch that can selectively establish optical paths between a plurality of inputs and a plurality of outputs. The photonic switch may alternatively be a tunable filter switch. Such tunable filter switches may be used in applications such as reconfigurable add/drop optical network switches, and in optical filters that are used to filter out unwanted signal components such as a sideband to create a single sideband signal.

Figure 3:
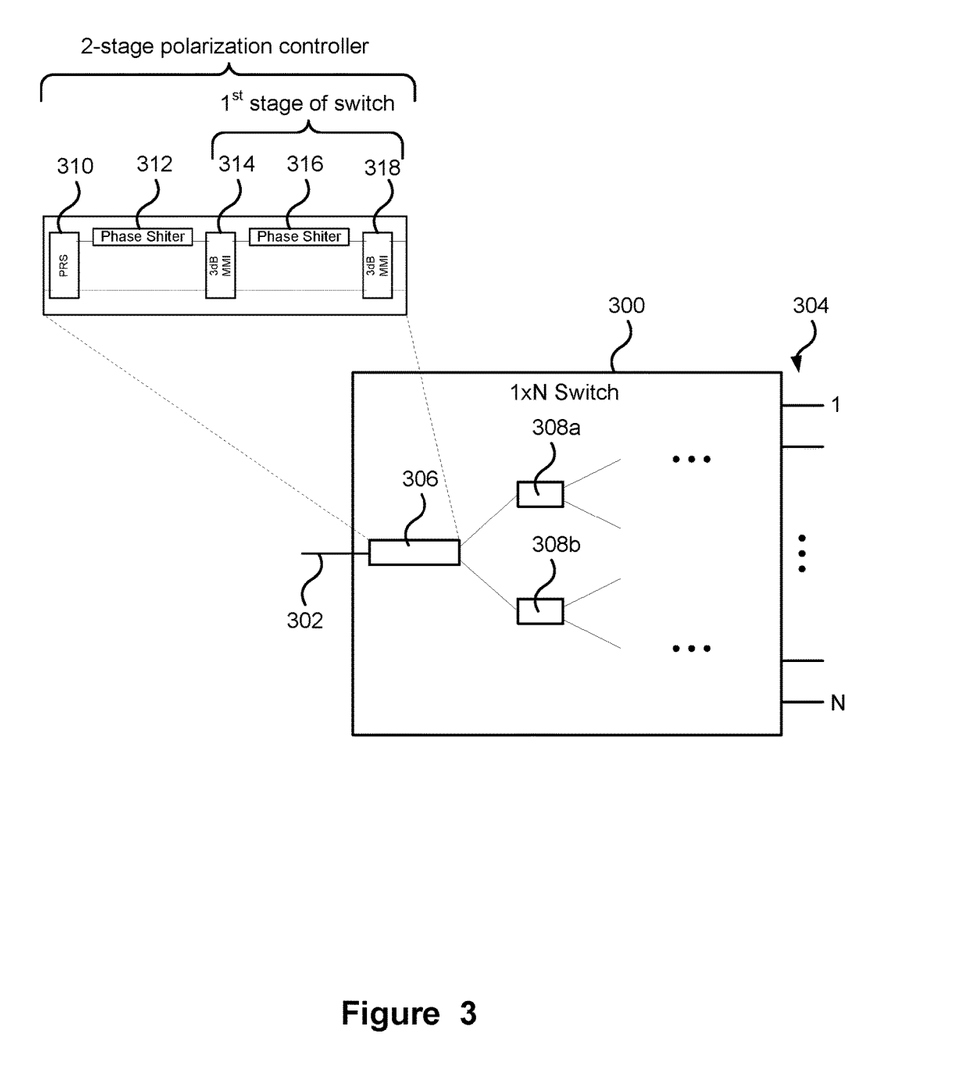
FIG. 3 depicts 1×N switching cell incorporating a polarization controller.

FIG. 3 depicts a 1×N switching cell incorporating a polarization controller. The input stages 202 described above with reference to FIG. 2 comprised a 1×2 switch incorporating a 3-stage polarization controller with the last stage of the polarization controller being provided by the 1×2 switch. As depicted in FIG. 3, 1×N switches 300 may incorporate polarization controllers. The 1×N switch 300 switches an input 302 to one of a plurality of outputs 304. The switching is accomplished by a number of individual switching cells arranged together. In particular, the 1×N switch comprises an input stage 306 that incorporates the polarization controller, which is depicted as being provided by a 2-stage polarization controller. In addition to controlling the polarization of the input, the input stage also switches the input signal, or rather the polarization adjusted input signal, to one of two further individual switching cells 308a, 308b. As will be appreciated, the number of individual switching cells required in a 1×N switch will depend upon the number of outputs, N as well as the switch architecture used. Assuming that the 1×N switch is provided by 1×2 individual switching cells, there may be, depending upon the particular switch architecture, $\log_2(N)$ stages of switching cells.

The input stage 306 of the 1×N switch comprises a polarization rotator splitter 310 that splits an incoming beam into orthogonal polarization components and rotates the polarization of one of the split beams by 90°. The two split beams are provided to different arms of an MZI structure. As described above with reference to FIG. 2, the polarization controller may comprise phase shifters in each arm of the MZI structure. However as depicted in FIG. 3, the polarization controller of the input stage 306 may include phase shifters 312, 316 in only one arm of the MZI structure. The different arms of the MZI structure are coupled to 3 dB MMI couplers 314, 318. The plurality of phase shifters 312, 316 and couplers 314, 318 provide a plurality of stages cascaded together to the PRS input element 310. The final stage of the polarization controller incorporates the first switching stage of the 1×N switch. That is the final stage of the polarization controller is capable of directing the polarization corrected signal to one of two paths, which are coupled to optical switching cells 308a, 308b.

Figure 4:
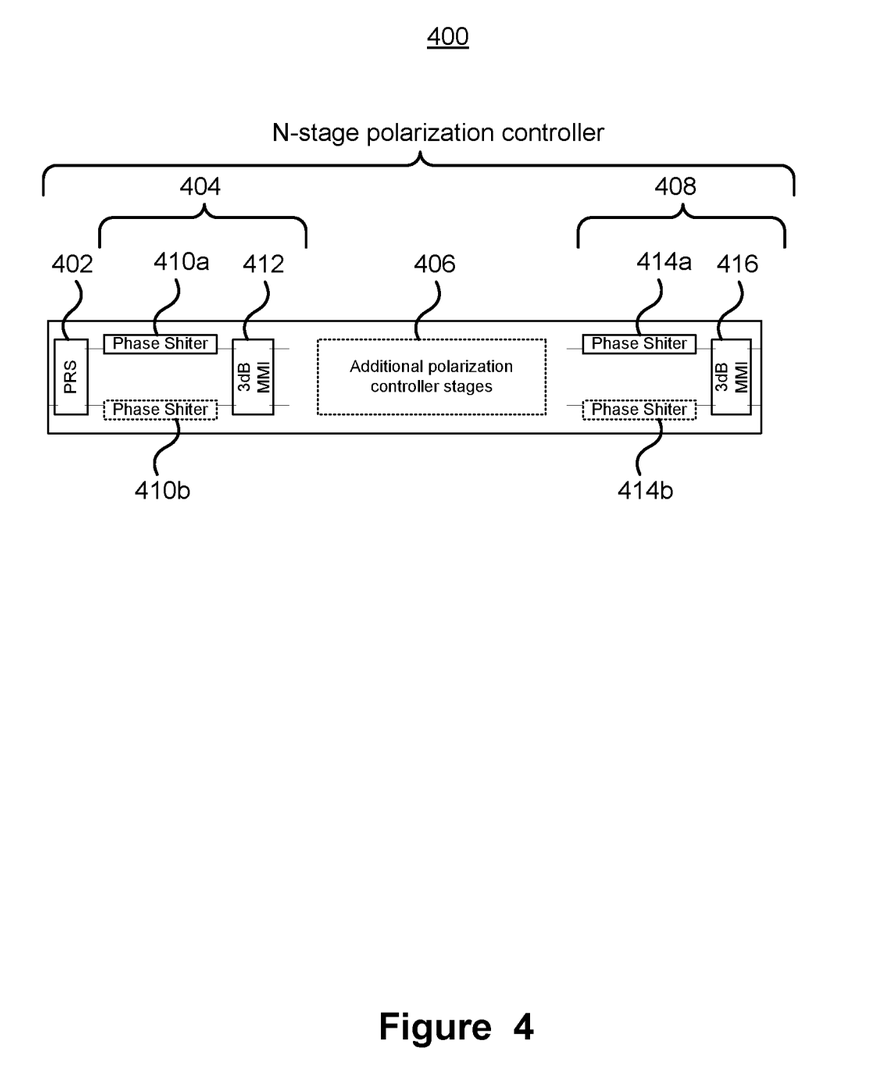
FIG. 4 depicts a N-stage polarization controller that may be incorporated into input switching cells.

FIG. 4 depicts an input stage of a switching cell incorporating an N-stage polarization controller. The figures above have described 3-stage and 2-stage polarization controllers incorporated into switching cell input stages. The input stage 400 incorporates an N-stage polarization controller. The input stage 400 may be used as the first stage of a photonic switch matrix. As depicted, the input stage 400 incorporates an N-stage polarization controller including an input element, depicted as a polarization rotator and splitter (PRS) 402, that splits an incoming beam into orthogonally polarized components. A plurality, N, of polarization controller stages, 404, 406, 408 are cascaded together to the polarization components output from the PRS input element 402. As depicted, the N stage polarization controller comprises a first stage 404 connected to the PRS input element 402, optional one or more additional polarization controller stages 406 cascaded together to the first polarization controller stage 404 and a last polarization controller stage 408 cascaded to the additional polarization controller stages 406, or directly to the first stage 404 if the polarization controller only has two stages. The last polarization controller stage 408 can selectively direct the polarization adjusted output beam to one of two outputs of the last polarization controller stage 408. Accordingly, the last polarization stage 408 also incorporates the first input switching stage of the switch matrix that the input stage 400 is part of. That is, the last polarization stage 408 also functions as the first input switching stage of the switch matrix, which may reduce insertion losses and optical power consumption of the switch matrix.

The individual polarization controller stages comprise phase shifters 410a, 410b, 414a, 414b arranged in opposing arms of an MZI structure with 3 dB MMI couplers 412, 416 combining the phase shifted signals in opposing arms and joining the stages 404, 406, 408 together. The phase shifters 410a, 410b, 414a, 414b are capable of adjusting a relative phase shift between optical signals in opposing arms of the input stage 400. The relative phase shift may be achieved using two, or more if desired, phase shifters as depicted in FIG. 4. Alternatively a single phase shifter may be used in one of the two arms, such as phase shifters 410a, 414a for the first and last stages 404, 408.

Figure 5:
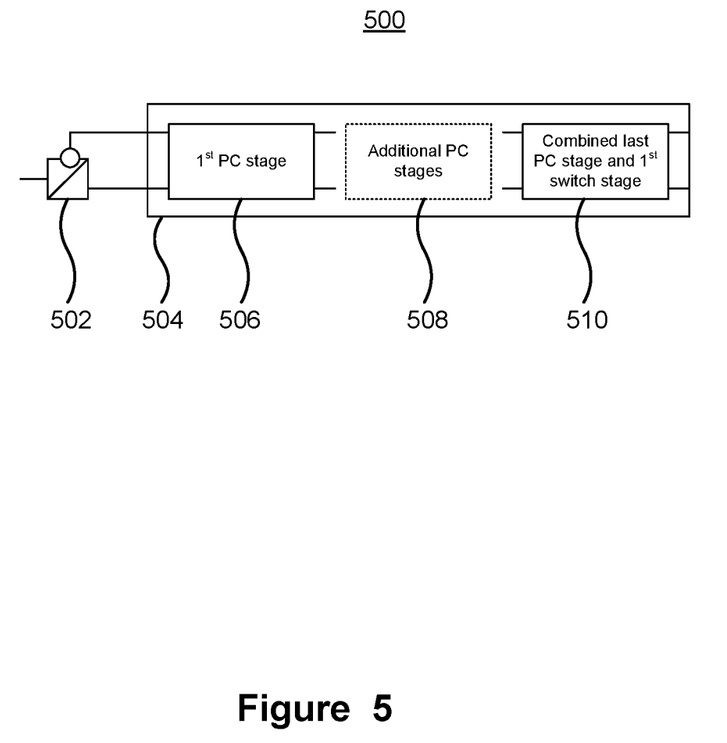
FIG. 5 depicts a 2-stage polarization controller having a separate beam splitter.

FIG. 5 depicts an input stage for a switch matrix incorporating a 2-stage polarization controller having a separate beam splitter. The above input stages incorporating polarization control described with reference to FIGS. 2 to 4 have depicted implementing the polarization rotator and splitter (PRS) element on the same chip as the other photonic components of the input stage. As depicted in FIG. 5, it is possible for the input stage 500 for a switch matrix to include a polarization rotator and splitter provided as an off-chip component 502. The on-chip components of the input stage 500 are similar to those described above with regard to FIGS. 2 to 4. In particular, the on-chip components 504 comprise a $1^{st}$ stage of a polarization controller 506, optional additional stages of the polarization controller 508 and the combined last stage of the polarization controller and the first stage of the switch matrix 510.

Figure 6:
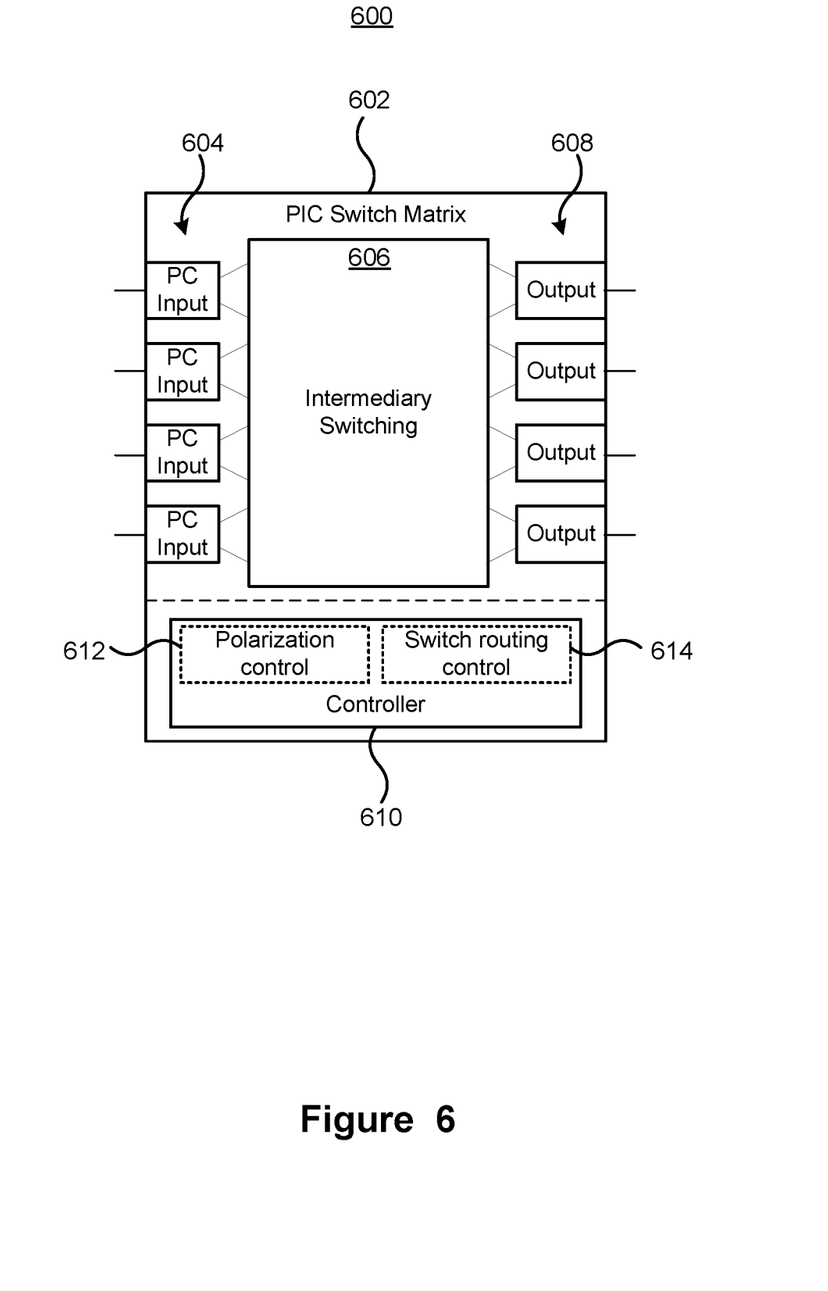
FIG. 6 depicts a matrix photonic switches incorporating polarization controllers.

FIG. 6 depicts a switch based on the switch matrix incorporating an application of photonic switches incorporating polarization controllers. The switch 600 may comprise a photonic integrated circuit switch matrix 602 that is manufactured using SOI techniques. The switch matrix 602 is depicted as a 4×4 switch, although different sizes of switches are possible. The switch matrix 602 is capable of selectively establishing optical paths between the inputs 604 and outputs 608 via the intermediary switching components 606. The inputs 604 incorporate polarization controllers as described above. In addition to the switch matrix 602 itself, the switch 600 may also comprise a controller 610 for controlling the operation of the switch matrix 602. The controller 610 may be implemented as an application specific integrated circuit (ASIC), field programmable gate array (FPGA), microprocessor or microcontroller, for example. The controller 610 may be implemented on the same chip as the photonic integrated circuit switch matrix 602, or may be implemented on a separate chip. Regardless of the particular implementation, the controller 610 provides polarization functionality 612 for controlling the polarization of input signals as well as switch routing functionality 614 for establishing the desired optical paths through the switch matrix 602. The switch routing functionality 614 may utilize various different approaches for determining the routing of signals through the switch matrix. Although depicted as distinct functionality, the polarization functionality and the switch routing functionality are combined in the polarization controller. Thus, the polarization controller functions as a first stage of the switch, providing both a switching function between one of two outputs of the polarization controller, and a polarization controlling function in the currently selected output of the polarization controller. Although not depicted in detail, the controller 610 may receive various feedback signals in order to perform the polarization control functionality as well as the switch routing. For example, the controller 610 may receive an indication of desired optical paths to be established, such as connection of a first input to a fourth output, etc. The polarization control may receive measurements or signals from different parts of the polarization controller in order to provide an indication of the state of polarization of the incoming signal. The measurements or signals may be provided through various optical taps on the optical path at various locations in the polarization controller of the polarization controlling inputs 602. The control algorithms applied to the polarization controllers may vary depending upon the number of stages present in the polarization controller, whether or not the polarization control is reset-free or may require periodic resets, the measurements along the optical path that are available as well as other factors.

The above has described various implementations for an input stage for a switch matrix that incorporates a polarization controller. The switch matrix with incorporated polarization controllers may be implemented as a silicon on insulator (SOI) photonic apparatus providing all-optical switching of signals. The incorporation of the polarization controller into the switch inputs provides a polarization independent optical switch in an SOI photonic circuit. It will be appreciated that the switch matrix incorporating polarization controllers works with light in which information is not carried by the polarization. The specific photonic components used in the switch matrix with integrated polarization controllers may vary. For example, the input component that splits an incoming beam into orthogonal polarization components may be provided by an on-chip component such as a polarization rotator splitter (PRS), a polarization-splitting surface grating coupler, or may be provided off-chip by a polarization beam splitter cube. The phase shifters within the MZI switch cell structures may be provided, for example, by thermo-optic switches or carrier injection switches. Similarly, the 3 dB MMI couplers described above may be replaced with alternative couplers, such as symmetric directional couplers, adiabatic couplers, etc.

Although a particular architecture of the switch matrix may vary, each architecture typically includes an initial 1×N input switch stage, as opposed to, for example a 2×2 switch. The 1×N input switch stage may be replaced with the input stage incorporating the polarization controller as described above. The polarization controller may provide endless polarization adjustment or may require a reset.

A photonic circuit providing a switch matrix incorporating polarization controller inputs as described above may be used in various applications such as all optical switches that switch non-coherent signals, or signals to be detected by non-coherent receivers. Although different applications will be apparent to one of ordinary skill in the art, examples of possible applications may include, for example, datacenter packet switching applications and high-throughput computing applications. An optical switch based on the switch matrix incorporating polarization controller inputs as described above may be manufactured on a SOI platform and provide an optical switch having lower insertion loss and power consumption, compared to a switch without incorporated polarization controllers The present disclosure provided, for the purposes of explanation, numerous specific embodiments, implementations, examples and details in order to provide a thorough understanding of the invention. It is apparent, however, that the embodiments may be practiced without all of the specific details or with an equivalent arrangement. In other instances, some well-known structures and devices are shown in block diagram form, or omitted, in order to avoid unnecessarily obscuring the embodiments of the invention. The description should in no way be limited to the illustrative implementations, drawings, and techniques illustrated, including the exemplary designs and implementations illustrated and described herein, but may be modified within the scope of the appended claims along with their full scope of equivalents.

While several embodiments have been provided in the present disclosure, it should be understood that the disclosed systems and components might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. A photonic switch matrix comprising:
   a plurality of 1×2 input switches, each 1×2 input switch comprising:
     an input port for receiving an optical beam;
     first and second output ports for outputting the optical beam in a pre-defined state of polarization;
     a polarization controller coupled to the input port for providing the pre-defined state of polarization of the optical beam, the polarization controller including at least one polarization controller stage comprising two optical paths associated with two polarization components of the optical beam; and
     an optical mixer stage coupled to the two optical paths of the at least one polarization controller stage for mixing light in the two optical paths so as to direct the optical beam in the pre-defined state of polarization to the first or second output port;
   a plurality of output switches; and
   a plurality of intermediary switches coupled to the plurality of 1×2 input switches and the plurality of output switches, for selectively establishing optical paths between the plurality of 1×2 input switches and the plurality of output switches.

2. The photonic switch matrix of claim 1, wherein each one of the plurality of 1×2 input switches further comprises:

an input element for splitting the input beam into the orthogonal polarization components.

3. The photonic switch matrix of claim 2, wherein the input element comprises one of:
   a polarization rotator splitter; and
   a polarization splitting surface grating coupler.

4. The photonic switch matrix of claim 1, wherein each of the at least one polarization controller stages and the optical mixer stage comprise a Mach-Zehnder Interferometer (MZI) structure with at least one phase shifter located in arms of the MZI structure connected at a coupler.

5. The photonic switch matrix of claim 4, wherein one or more of the couplers of the at least one polarization controller stages and the optical mixer stage comprises one of:
   a symmetric directional coupler;
   an adiabatic coupler; and
   a multimode interference (MMI) coupler.

6. The photonic switch matrix of claim 4, wherein one or more of the phase shifters of the at least one polarization controller stages and the optical mixer stage comprises one of:
   a thermo-optic phase shifter; and
   a carrier injection phase shifter.

7. The photonic switch matrix of claim 1, wherein a combination of the polarization controller and the optical mixer stage provide a 2-stage polarization controller, and the polarization controller and the optical mixer stage of each one of the plurality of 1×2 input switches comprise:
   a phase shifter located in one of two arms of a first Mach-Zehnder Interferometer (MZI) structure, the two arms of the first MZI structure coupled to the optical paths associated with the orthogonal polarization components;
   a first optical coupler connected to the two arms of the first MZI structure providing two output optical paths;
   at least one phase shifter located in one of two arms of a second MZI structure, the two arms of the second MZI structure coupled to the two output optical paths of the first optical coupler; and
   a second optical coupler connected to the two arms of the second MZI structure providing two output optical paths.

8. The photonic switch matrix of claim 7, wherein a combination of the polarization controller and the optical mixer stage provide a 3-stage polarization controller and the polarization controller and the optical mixer stage of each one of the plurality of 1×2 input switches comprise:
   at least one phase shifter located in one of two arms of a first Mach-Zender Interferometer (MZI) structure, the two arms of the first MZI structure coupled to the optical paths associated with the orthogonal polarization components;
   a first optical coupler connected to the two arms of the first MZI structure providing two output optical paths;
   at least one phase shifter located in one of two arms of a second MZI structure, the two arms of the second MZI structure coupled to the two output optical paths of the first optical coupler;
   a second optical coupler connected to the two arms of the second MZI structure providing two output optical paths;
   at least one phase shifter located in one of two arms of a third MZI structure, the two arms of the third MZI structure coupled to the two output optical paths of the second optical coupler; and
   a third optical coupler connected to the two arms of the third MZI structure providing two output optical paths.

9. The photonic switch matrix of claim 7, wherein a combination of the polarization controller and the optical mixer stage provide a 4-stage polarization controller, and the polarization controller and the optical mixer stage of each one of the plurality of 1×2 input switches comprise:
   at least one phase shifter located in one of two arms of a first Mach-Zender Interferometer (MZI) structure, the two arms of the first MZI structure coupled to the optical paths associated with the orthogonal polarization components;
   a first optical coupler connected to the two arms of the first MZI structure providing two output optical paths;
   at least one phase shifter located in one of two arms of a second MZI structure, the two arms of the second MZI structure coupled to the two output optical paths of the first optical coupler;
   a second optical coupler connected to the two arms of the second MZI structure providing two output optical paths;
   at least one phase shifter located in one of two arms of a third MZI structure, the two arms of the third MZI structure coupled to the two output optical paths of the second optical coupler;
   a third optical coupler connected to the two arms of the third MZI structure providing two output optical paths;
   at least one phase shifter located in one of two arms of a fourth MZI structure, the two arms of the fourth MZI structure coupled to the two output optical paths of the third optical coupler; and
   a fourth optical coupler connected to the two arms of the fourth MZI structure providing two output optical paths.

10. A photonic switch comprising:
   a photonic switch matrix comprising:
      a plurality of 1×2 input switches, each 1×2 input switch comprising:
         an input port for receiving an optical beam;
         first and second output ports for outputting the optical beam in a pre-defined state of polarization;
         a polarization controller coupled to the input port for providing the pre-defined state of polarization of the optical beam, the polarization controller including at least one polarization controller stage comprising two optical paths associated with two polarization components of the optical beam; and
         an optical mixer stage coupled to the two optical paths of the at least one polarization controller stage for mixing light in the two optical paths so as to direct the optical beam in the pre-defined state of polarization to the first or second output port;
      a plurality of output switches; and
      a plurality of intermediary switches coupled to the plurality of 1×2 input switches and the plurality of output switches, for selectively establishing optical paths between the plurality of 1×2 input switches and the plurality of output switches; and
   a controller for controlling a polarization of the input beams associated with each of the 1×2 switches and for routing optical paths through the switch matrix.

11. The photonic switch of claim 10, wherein the controller and the photonic switch matrix are implemented on a single silicon on insulator (SOI) chip.

12. The photonic switch of claim 11, wherein each one of the plurality of 1×2 input switches further comprises
   an input element for splitting the input beam into the orthogonal polarization components.

13. The photonic switch of claim 12, wherein the input element comprises one of:
   a polarization rotator splitter; and
   a polarization splitting surface grating coupler.

14. The photonic switch of claim 11, further comprising a plurality of polarization rotator and splitter (PRS) elements located off-chip from the switch matrix, each one of the plurality of PRS elements associated with a respective one of the 1×2 input switches.

15. The photonic switch of claim 10, wherein each polarization controller stage and the optical mixer stage comprise a Mach-Zehnder Interferometer (MZI) structure with at least one phase shifter located in arms of the MZI structure connected at a coupler.

16. The photonic switch of claim 15, wherein one or more of the couplers of the at least one polarization controller stage and the optical mixer stage comprises one of:
   a symmetric directional coupler;
   an adiabatic coupler; and
   a multimode interference (MMI) coupler.

17. The photonic switch of claim 16, wherein one or more of the phase shifters of the at least one polarization controller stages and the optical mixer stage comprises one of:
   a thermo-optic phase shifter; and
   a carrier injection phase shifter.

18. The photonic switch of claim 11, wherein a combination of the polarization controller and the optical mixer stage provide a 2-stage polarization controller and the polarization controller and the optical mixer stage of each one of the plurality of 1×2 input switches comprise:
   at least one phase shifter located in one of two arms of a first Mach-Zehnder Interferometer (MZI) structure, the two arms of the first MZI structure coupled to the optical paths associated with the orthogonal polarization components;
   a first optical coupler connected to the two arms of the first MZI structure providing two output optical paths;
   at least one phase shifter located in one of two arms of a second MZI structure, the two arms of the second MZI structure coupled to the two output optical paths of the first optical coupler; and
   a second optical coupler connected to the two arms of the second MZI structure providing two output optical paths.

19. The photonic switch of claim 11, wherein a combination of the polarization controller and the optical mixer stage provide a 3-stage polarization controller and the polarization controller and the optical mixer stage of each one of the plurality of 1×2 input switches comprise:
   at least one phase shifter located in one of two arms of a first Mach-Zender Interferometer (MZI) structure, the two arms of the first MZI structure coupled to the optical paths associated with the orthogonal polarization components;
   a first optical coupler connected to the two arms of the first MZI structure providing two output optical paths;
   at least one phase shifter located in one of two arms of a second MZI structure, the two arms of the second MZI structure coupled to the two output optical paths of the first optical coupler;
   a second optical coupler connected to the two arms of the second MZI structure providing two output optical paths;
   at least one phase shifter located in one of two arms of a third MZI structure, the two arms of the third MZI structure coupled to the two output optical paths of the second optical coupler; and
   a third optical coupler connected to the two arms of the third MZI structure providing two output optical paths.

20. The photonic switch of claim 11, wherein a combination of the polarization controller and the optical mixer stage provide a 4-stage polarization controller and the polarization controller and the optical mixer stage of each one of the plurality of 1×2 input switches comprise:
   at least one phase shifter located in one of two arms of a first Mach-Zender Interferometer (MZI) structure, the two arms of the first MZI structure coupled to the optical paths associated with the orthogonal polarization components;
   a first optical coupler connected to the two arms of the first MZI structure providing two output optical paths;
   at least one phase shifter located in one of two arms of a second MZI structure, the two arms of the second MZI structure coupled to the two output optical paths of the first optical coupler;
   a second optical coupler connected to the two arms of the second MZI structure providing two output optical paths;
   at least one phase shifter located in one of two arms of a third MZI structure, the two arms of the third MZI structure coupled to the two output optical paths of the second optical coupler;
   a third optical coupler connected to the two arms of the third MZI structure providing two output optical paths;
   at least one phase shifter located in one of two arms of a fourth MZI structure, the two arms of the fourth MZI structure coupled to the two output optical paths of the third optical coupler; and
   a fourth optical coupler connected to the two arms of the fourth MZI structure providing two output optical paths.

* * * * *